(No Model.)
E. K. BECKWITH.
COMBINED GAGE AND SQUARE.
No. 387,966. Patented Aug. 14, 1888.
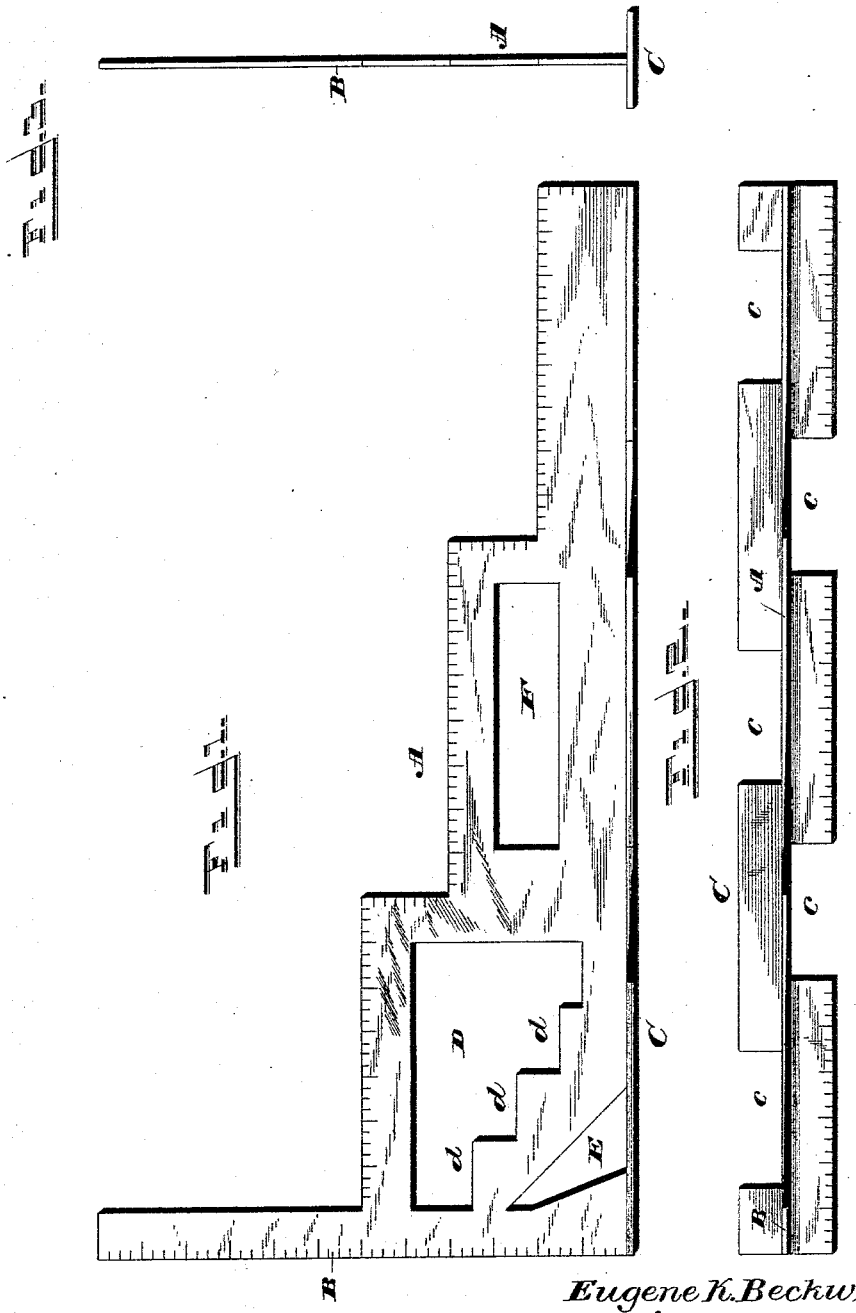
WITNESSES,
G. S. Elliott
W. Johnson
Eugene K. Beckwith.
INVENTOR.
by
Attorney.

UNITED STATES PATENT OFFICE.

EUGENE K. BECKWITH, OF NIANTIC, CONNECTICUT, ASSIGNOR OF ONE-HALF TO GEORGE P. HILL, OF SAME PLACE.

COMBINED GAGE AND SQUARE.

SPECIFICATION forming part of Letters Patent No. 387,966, dated August 14, 1888.

Application filed April 12, 1888. Serial No. 270,456. (No model.)

*To all whom it may concern:*

Be it known that I, EUGENE K. BECKWITH, a citizen of the United States of America, residing at Niantic, in the county of New London and State of Connecticut, have invented certain new and useful Improvements in a Combined Gage and Square; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in carpenters' squares or gages, the object of the same being to provide an implement which can be advantageously used for laying off lumber, to mark mortises, or for laying off angles, bevels, &c.; and it consists in the special construction and combination of the parts, as will be hereinafter fully set forth, and specifically pointed out in the claims.

In the accompanying drawings, Figure 1 is a side view of a gage or square constructed in accordance with my improvement. Fig. 2 is a plan view, and Fig. 3 an edge view.

The tool I am about to describe is preferably made up of steel, though other material may be employed; and it consists of the main portion A and member B, which extend at right angles with what I term the "base" or "flange" C. This flange is rigidly connected to the outer edge of the long arm of the implement. The main arm A, near its juncture with the arm or member B, has an opening, D, formed with jogs *d d*, connected to each other and resembling a series of steps, and beneath this opening D is a smaller one, E, one side of which is formed with an angle of forty-five degrees, while the opposite side makes an angle of seventy degrees, these different angles being used for laying off miters of different angles. Adjacent to the opening D the main arm A is formed with a rectangular opening, F.

The inner edge of the long arm of the implement is provided with a series of jogs, commencing at the member B and continuing down to the outer end of the arm, their edges having scale-marks thereon, as shown.

The flange C has a series of rectangular cut-away portions, *c c*, both for the purpose of lightening the instrument and permitting it to be placed upon a joist or other piece of lumber when marking.

When it is desired to cut mortises, the rectangular opening F is used, and the mark for the tenon is placed upon another piece of lumber by using the same opening as a marking-gage. When it is desired to mark mortises not of a standard size, the implement may be slid along the piece of timber until the proper indicative marks are reached. When two sides of the mortise or tenon have been marked, the implement is reversed. By proper manipulation of the implement the proper gage-marks can be placed upon the lumber and the complete lines finished by using another portion of the gage.

In practice the implement will be of such a size that it can be used for marking lumber from seven-eighths of an inch in thickness upward to the usual sizes, and the cut-away portions *c c* not only lighten the implement, but also permit of its being readily picked up when lying flat. Gage-marks are also placed on the flanges C C for marking distances.

What I claim as new is—

1. As an improved article of manufacture, the device herein set forth, consisting of a square having a T-headed flange provided at intervals on opposite sides of its center with jogs *c c*, the arms A and member B, a mortise-opening, F, the opening D, havings jogs *d d*, and the miter-opening E, having walls of different angularity, substantially as described.

2. The combination, in a device for laying off lumber, of a square having a T-headed flange, said flange being provided at intervals on opposite sides of its center with jogs *c c*, substantially as shown.

In testimony whereof I affix my signature in presence of two witnesses.

EUGENE K. BECKWITH.

Witnesses:
M. W. COMSTOCK,
L. C. COMSTOCK.